United States Patent Office 3,481,967
Patented Dec. 2, 1969

3,481,967
PROCESS FOR PREPARING AROMATIC ISOCYANATES
Gerhard F. Ottmann and Ehrenfried H. Kober, Hamden, and David F. Gavin, New Haven, Conn., assignors to Olin Mathieson Chemical Corporation, a corporation of Virginia
No Drawing. Filed Apr. 1, 1966, Ser. No. 539,332
Int. Cl. C07c *119/04, 79/46;* C07d *93/00*
U.S. Cl. 260—453                                                                                 9 Claims

ABSTRACT OF THE DISCLOSURE

The process for preparing an aromatic isocyanate which comprises reacting an aromatic nitro compound and carbon monoxide in the presence of a catalytic proportion of a non-noble transition metal-based catalyst at elevated temperature and elevated pressure. Suitable non-noble transition metal-based catalysts include compounds such as cobalt iodide, titanium tetrachloride, and mixtures thereof.

---

This invention relates to the preparation of organic isocyanates.

There is an increasing demand for organic isocyanates for use in the preparation of urethane foams and coatings, as well as in the preparation of insecticides, pesticides and the like.

The usual commercial process for preparing organic isocyanates requires the catalytic hydrogenation of an organic nitro compound to form the corresponding amine, followed by reaction of the amine with phosgene to form the corresponding isocyanate.

The prior art proposes a process for preparing isocyanates from the corresponding nitro compound by reacting an organic nitro compound with carbon monoxide in the presence of a noble metal-based catalyst. In actual practice, however, when this process is employed to react an organic nitro compound with carbon monoxide using noble metal-based catalyst, such as rhodium trichloride, palladium chloride, iridium trichloride, osmium trichloride and the like, no more than trace amounts of organic isocyanates are obtained, if any are obtained at all.

In view of the expensive techniques available to prepare organic isocyanates, there is a great need in the industry for a simple, economic process for preparing organic isocyanates from the corresponding organic nitro compounds.

It is an object of this invention to provide an improved process for preparing organic isocyanates.

Another object of the invention is to provide a novel catalyst system useful in the direct conversion of organic nitro compounds to the corresponding organic isocyanates.

Still a further object is to provide an improved process for preparing phenyl isocyanate.

It is another object of the invention to provide an improved process for preparing toluene diisocyanates.

Anther object of the invention is to provide an improved process for preparing bis(isocyanatophenyl)methanes.

These and other objects of the invention will be apparent from the following description thereof.

It has now been discovered tht the above-mentioned objects are accomplished when an organic nitro compound is reacted with carbon monoxide in the presence of a non-noble transition metal-based catalyst.

Any organic nitro compound capable of being converted to an organic isocyanate may be employed as a reactant. Generally, aromatic mono- or poly-nitro compounds may be reacted to form the corresponding mono- or poly-isocyanates by the novel process of this invention. Typical examples of suitable aromatic and substituted aromatic nitro compounds which can be reacted to form isocyanates include the following:

(I) AROMATIC NITRO COMPOUNDS (a) Nitrobenzene
(b) Nitronaphthalenes
(c) Nitroanthracenes
(d) Nitrobiphenyls
(e) Bis(nitrophenyl)methanes
(f) Bis(nitrophenyl)ethers
(g) Bis(nitrophenyl)thioether
(h) Bis(nitrophenyl)sulfones
(i) Nitrodiphenoxy alkanes
(j) Nitrophenothiazines All of the aforementioned compounds may be substituted with one or more additional substituents such as nitro, nitroalkyl, alkyl, alkenyl, alkoxy, aryloxy, halogen, alkylthio, arylthio, carboxyalkyl, cyano, isocyanato, and the like, and employed as reactants in the novel process of this invention. Specific examples of suitable substituted-nitro compounds which can be used are as follows:

(1) o-Nitrotoluene
(2) m-Nitrotoluene
(3) p-Nitrotoluene
(4) o-Nitro-p-xylene
(5) 2-methyl-1-nitronaphthalene
(6) m-Dinitrobenzene
(7) p-Dinitrobenzene
(8) 2,4-dinitrotoluene
(9) 2,6-dinitrotoluene
(10) Dinitromesitylene
(11) 4,4′-dinitrobiphenyl
(12) 2,4-dinitrobiphenyl
(13) 4,4′-dinitrobibenzyl
(14) Bis(p-nitrophenyl)methane
(15) Bis(2,4-dinitrophenyl)methane
(16) Bis(p-nitrophenyl)ether
(17) Bis(2,4-dinitrophenyl)ether
(18) Bis(p-nitrophenyl)thioether
(19) Bis(p-nitrophenyl)sulfone
(20) Bis(p-nitrophenoxy)ethane
(21) α,α′-Dinitro-p-xylene
(22) 2,4,6-trinitrotoluene
(23) 1,3,5-trinitrobenzene
(24) 1-chloro-2-nitrobenzene
(25) 1-chloro-4-nitrobenzene
(26) 1-chloro-3-nitrobenzene
(27) 2-chloro-6-nitrotoluene
(28) 4-chloro-3-nitrotoluene
(29) 1-chloro-2,4-dinitrobenzene
(30) 1,4-dichloro-2-nitrobenzene
(31) Alpha-chloro-p-nitrotoluene
(32) 1,3,5-trichloro-2-nitrobenzene
(33) 1,3,5-trichloro-2,4-dinitrobenzene
(34) 1,2-dichloro-4-nitrobenzene
(35) Alpha-chloro-m-nitrotoluene
(36) 1,2,4-trichloro-5-nitrobenzene
(37) 1-bromo-4-nitrobenzene
(38) 1-bromo-2-nitrobenzene
(39) 1-bromo-3-nitrobenzene
(40) 1-bromo-2,4-dinitrobenzene
(41) α,α-Dibromo-p-nitrotoluene
(42) α-Bromo-p-nitrotoluene
(43) 1-fluoro-4-nitrobenzene
(44) 1-fluoro-2-dinitrobenzene
(45) 1-fluoro-2-nitrobenzene
(46) o-Nitrophenyl isocyanate
(47) m-Nitrophenyl isocyanate

(48) p-Nitrophenyl isocyanate
(49) o-Nitroanisole
(50) p-Nitroanisole
(51) p-Nitrophenetole
(52) o-Nitrophenetole
(53) 2,4-dinitrophenetole
(54) 2,4-dinitroanisole
(55) 1-chloro-2,4-dimethoxy-5-nitrobenzene
(56) 1,4-dimethoxy-2-nitrobenzene
(57) m-Nitrobenzaldehyde
(58) p-Nitrobenzaldehyde
(59) p-Nitrobenzoylchloride
(60) m-Nitrobenzoylchloride
(61) 3,5-dinitrobenzoylchloride
(62) Ethyl-p-nitrobenzoate
(63) Methyl-o-nitrobenzoate
(64) m-Nitrobenzenesulfonylchloride
(65) p-Nitrobenzenesulfonylchloride
(66) o-Nitrobenzenesulfonylchloride
(67) 4-chloro-3-nitrobenzenesulfonylchloride
(68) 2,4-dinitrobenzenesulfonylchloride
(69) 3-nitrophthalic anhydride
(70) p-Nitrobenzonitrile
(71) m-Nitrobenzonitrile In addition, isomers and mixtures of the aforesaid organic nitro compounds and substituted organic nitro compounds may also be employed, as well as homologues and other related compounds. Generally, the organic nitro compounds and substituted organic nitro compounds contain between 1 and about 20, and preferably between about 1 and about 14 carbon atoms.

It has now been discovered that a successful conversion of an organic nitro compound to the corresponding isocyanate can be accomplished in the presence of at least one non-noble transition metal-based catalyst. Materials suitable for use as the catalyst encompass the elements of the Groups Ib, IIb, IIIa, IIIb, IVa, IVb, Va, Vb, VIa, VIIa, VIII, of the Periodic Table, but exclude the noble metals. These groups are selected from the Periodic Table shown on page 122 of Inorganic Chemistry, by Moeller, John Wiley and Sons, Inc., 1952. The catalyst may be employed in elemental form or as compounds thereof, such as iodides, bromides, chlorides, nitrates, sulfates, sulfides, etc., and certain alloys thereof. When comparing the effectiveness of the catalysts, it was found that certain metals, compounds of the metals and certain alloys of such metals had a much greater catalytic effect than others and, therefore, are preferably employed. Those metals, in elemental, compound or alloy form, which are preferred include titanium chromium, silicon, germanium, cobalt, nickel, vanadium, molybdenum, tungsten, and manganese. Compounds thereof include iodides, bromides, chlorides, nitrates, sulfates, sulfides, etc.

The various catalysts can be self-supported or deposited on a support or carrier for dispersing the metal to increase its reactive surface. Alumina, silica, carbon, barium sulfate, calcium carbonate, asbestos, bentonite, diatomaceous earth, fuller's earth, and analogous materials are useful for said purpose.

The various catalysts capable of effecting the transformation of an organic nitro compound to an organic isocyanate under the reaction conditions are employed in a catalytic proportion in the process of this invention. The proportion of catalyst system is generally equivalent to between about 0.01 and about 50.0 percent, and preferably between about 0.1 and about 4.0 percent by weight of the organic nitro compound. However, greater or lesser proportions may be employed if desired.

The aforementioned process works in the absence of a solvent, and works particularly well in the presence of a solvent which is chemically inert within the system of this invention. A particularly preferred solvent is sulfur dioxide. While the theory of the reaction is not completely understood, it is believed that sulfur dioxide enhances ionization of the nitro groups, eases thereby the abstraction of oxygen, and carries the oxygen to the carbon monoxide which then is converted to carbon dioxide.

When a solvent such as sulfur dioxide is employed in the process of this invention, the proportion is generally equivalent to a molar ratio of moles of sulfur dioxide per mole of organic nitro compound in the range between about 0.05:1 and about 25:1, and preferably between about 0.1:1 and about 10:1.

The order of mixing the reactants is not critical and may be varied within the limitations of the equipment employed. In one embodiment, the organic nitro compound, catalyst, and, if desired, sulfur dioxide are charged to a suitable pressure vessel such as an autoclave which was previously purged with nitrogen, and which is preferably provided with agitation means such as a stirrer or an external rocking mechanism. Carbon monoxide is fed to the autoclave until a pressure is attained which is in the range between about 40 and about 10,000 p.s.i.g., and preferably between about 100 and about 5000 p.s.i.g., but greater or lesser pressures may be employed if desired.

Generally the quantity of carbon monoxide in the free space of the reactor is sufficient to maintain the desired pressure as well as provide reactant for the process. If desired, additional carbon monoxide can be fed to the reactor either intermittently or continuously as the reaction progresses. The total proportion of carbon monoxide added during the reaction will depend on the volume of free space in the reactor and the pressure desired, but it is generally equivalent to a molar ratio of carbon monoxide to nitro groups in the organic nitro compound in the range between about 0.1:1 and about 50:1, and is preferably between about 0.3:1 and about 20:1.

The reactor is heated by suitable internal or external means to maintain the temperature in the range between about 25° C. up to the decomposition temperature of the isocyanate and preferably between about 150 and about 215° C.

The reaction time is not critical and is generally in the range between about 0.01 and about 48 hours and preferably in the range between about 0.5 and about 4 hours.

After the reaction is completed, the temperature of the crude reaction mixture may be dropped to ambient temperature, the pressure vessel is vented, and the reaction products are removed from the reaction vessel. Filtration or other suitable solid-liquid separation technique may be employed to separate the catalyst from the reaction product, and fractional distillation is preferably employed to isolate the organic isocyanate from the reaction product. However, other suitable separation techniques such as extraction, sublimation, etc. may be employed to separate the organic isocyanate from the unreacted organic nitro compound and any by-products that may be formed.

Organic isocyanates produced in accordance with the technique of this invention are suitable for use in preparing urethane compounds such as foams, coatings, fibers, and the like by reacting the organic isocyanate with a suitable polyether polyol in the presence of a catalyst and, if desired, a foaming agent, and as intermediates for biologically active compounds.

The following examples are presented to further illustrate the invention without any intention of being limited thereby.

EXAMPLE 1

An 1180 ml. rocking autoclave was charged with 100 g. (0.83 mole) of nitrobenzene and 1.0 g. of cobalt iodide as catalyst. The reactor was closed, purged with nitrogen and then with carbon monoxide, and finally pressurized with carbon monoxide to 1300 p.s.i. corresponding to approximately 4.2 moles of carbon monoxide. The reaction mixture was heated to 200° C., and this temperature was maintained for three hours. A maximum pressure of 2300 p.s.i. was observed. The reactor was cooled to room temperature and the gases consisting of carbon monoxide and carbon dioxide were released. The reaction product was analyzed by infrared spectroscopy and by programmed vapor phase chromatography and was found to contain phenyl isocyanate.

For purposes of comparison, the procedure was repeated employing a noble metal-based catalyst, rhodium trichloride, instead of cobalt iodide. When rhodium trichloride was employed, no trace of phenyl isocyanate was indicated and nitrobenzene was recovered quantitatively.

EXAMPLE 2

An 1180 ml. autoclave was charged with 100 g. (0.8³ mole) of nitrobenzene, and 1.0 g. of cobalt iodide. The reaction vessel was closed, and cooled to −50° C. after air had been replaced by dry nitrogen. Sulphur dioxide (125 g.,2.0 moles) was added by means of a pressure transfer cylinder. The autoclave, which then was pressurized with carbon monoxide to 1400 p.s.i. (approximately 4 moles), was heated to 200° C. (the pressure at this temperature was 2200 p.s.i.) and kept at this temperature for four hours. After cooling to room temperature, the gases were vented and the liquid content distilled. The reaction product contained phenyl isocyanate and some unreacted nitrobenzene.

EXAMPLE 3

A 300 ml. autoclave was charged with 25 g. (0.2 mole) of nitrobenzene, and 1.0 g. of titanium tetrachloride. The reaction vessel was closed, and cooled to −25° C. after air had been replaced by dry nitrogen. Sulfur dioxide (70 g., 1.1 moles) was added by means of a pressure transfer cylinder. The autoclave, which then was pressurized with carbon monoxide to 1300 p.s.i. (approximately 0.9 mole), was heated to 205° C. (the pressure at this temperature was 2875 p.s.i.) and kept at this temperature for two hours. After cooling to room temperature, the gases were vented and the liquid analyzed by infrared spectroscopy and vapor phase chromatography. Both methods evidenced the formation of phenyl isocyanate.

Various modifications of the invention, some of which have been referred to above, can be made without departing from the spirit of the invention. What is desired to be secured by Letters Patent is:

1. In the process for preparing an organic isocyanate by reacting an aromatic nitro compound containing up to 20 carbon atoms with carbon monoxide at an elevated temperature and an elevated pressure in the presence of a catalyst, the improvement which comprises employing as said catalyst a non-noble transition metal-based catalyst selected from the group consisting of:
   (A) a metal selected from the group consisting of titanium, chromium, silicon, germanium, cobalt, nickel, vanadium, molybdenum, tungsten and manganese,
   (B) compounds of the metals of (A) wherein said compound is selected from the group consisting of iodides, bromides, chlorides, nitrates, sulfates and sulfides,
   (C) the proportion of said catalyst being in the range between about 0.01 and about 50 percent by weight of said aromatic nitro compound.

2. The process of claim 1 wherein said aromatic nitro compound is nitrobenzene.

3. The process of claim 1 wherein said aromatic nitro compound is selected from the group consisting of dinitrotoluene and bis(nitrophenyl)methane.

4. The process of claim 1 wherein sulfur dioxide is added to the reaction mixture in a proportion equivalent to a molar ratio of sulfur dioxide per mole of said aromatic nitro compound in the range between about 0.05:1 and about 25:1.

5. The process of claim 1 wherein said catalyst is selected from the group consisting of cobalt iodide and titanium tetrachloride.

6. The process of claim 5 wherein said aromatic nitro compound is nitro benzene.

7. The process of claim 5 wherein said aromatic nitro compound is selected from the group consisting of dinitrotoluene and bis(nitrophenyl)methane.

8. The process of claim 5 wherein sulfur dioxide is added to the reaction mixture in a proportion equivalent to a molar ratio of sulfur dioxide per mole of said aromatic nitro compound in the range between about 0.05:1 and about 25:1.

9. The process of claim 6 wherein sulfur dioxide is added to the reaction mixture in a proportion equivalent to a molar ratio of sulfur dioxide per mole of said aromatic nitro compound in the range between about 0.05:1 and about 25:1.

References Cited

UNITED STATES PATENTS

| 3,070,618 | 12/1962 | Drummond | 260—453 |
| 3,370,078 | 2/1968 | Bennett et al. | 260—453 |

FOREIGN PATENTS 651,876  2/1965  Belgium.

CHARLES B. PARKER, Primary Examiner

D. H. TORRENCE, Assistant Examiner

U.S. Cl. X.R.

252—461, 463, 467, 472, 475, 476; 260—2.5, 77.5, 243, 343.3, 465, 471, 543, 544, 599, 609, 645, 646, 689, 999